Nov. 5, 1957  A. CINK  2,811,858
ROLLER CHAIN LOCK
Filed Sept. 25, 1956

INVENTOR.
Albin Cink
BY

United States Patent Office 2,811,858
Patented Nov. 5, 1957

2,811,858
ROLLER CHAIN LOCK

Albín Cink, Vsetín, Czechoslovakia

Application September 25, 1956, Serial No. 612,001

Claims priority, application Czechoslovakia
October 27, 1955

3 Claims. (Cl. 74—258)

The present invention relates to a roller chain lock.

In practice it is often necessary to surround various mechanisms with a roller chain, the circumferential dimension of the surrounded bodies being variable according to requirements, and the chain, when shortened or lengthened by a certain number of links has to transmit forces over chain wheels as if it were not divided. In such a case the chain has to be joined by means of a lock which complies with these requirements.

Up to now shortening or lengthening of the chain to the required length has been effected by removing or inserting a corresponding number of links, which are connected by means of known chain locks. This procedure is disadvantageous, in that it is necessary to have available a considerable number of locks and individual links apart from the fact that the operation connected therewith is tedious and inconvenient. Further shortening of the chain cannot in this way be effected for an increment of less than two pitches.

The present invention concerns a simple lock for a block chain which allows the required shortening or lengthening of the effective length of the chain without removing or adding links, by one or more pitches in a quick and convenient manner. The requirements placed on such a lock are: retention of the pitch of the chain links, free movement of the link over a chain wheel and transmission of force by the chain.

Figure 1:
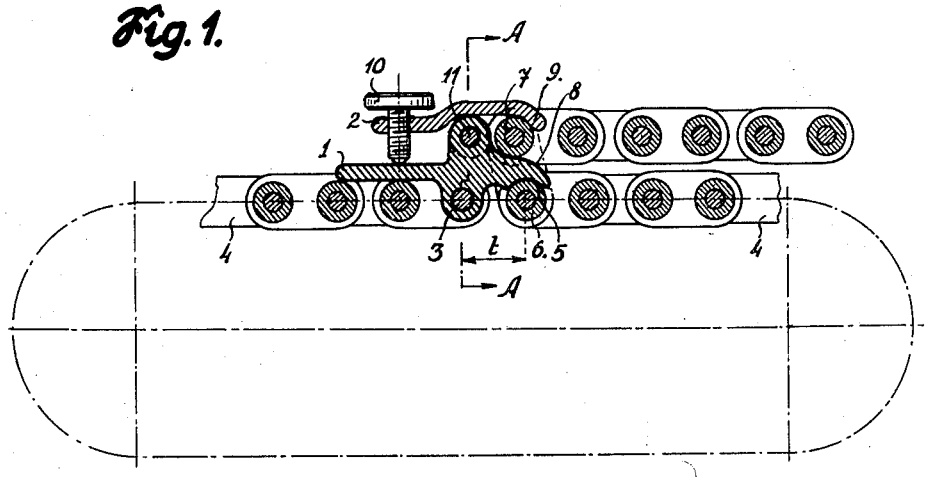
Figure 2:
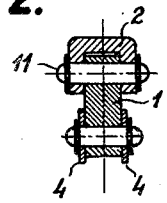

A lock according to the invention is shown by way of example in the accompanying drawing, wherein Fig. 1 is a longitudinal sectional view of the lock and the adjoining part of the chain and Fig. 2 is a sectional view along the line A—A of Fig. 1.

A roller chain lock according to the invention includes two rotatable jaws 1 and 2 which are pivotally connected to each other by a pin 11. The jaw 1 is secured by means of a pin 3 to one end of a chain 4. At the distance of one pitch "$t$" from the pin 3 the jaw 1 is provided with a cylindrical seat or recess 5 with which it is adapted to rest against a sleeve 6 of a link of the chain 4. The sleeve 6 is inserted into the seat 5 and tightened against the latter by causing a sleeve 7 of the adjacent chain link to slide along a cylindrical surface 8 on the jaw 1 arranged eccentrically with respect to the axis of the recess 5. In this position the sleeve 7 is secured by a nose 9 formed at one end of the jaw 2 and partially surrounding the sleeve 7, tightening of the nose 9 against the sleeve 7 being effected by means of a screw 10 which is threaded through the jaw 2 and abuts against the jaw 1. The free end of the chain 4 is loose. With this arrangement of the lock the chain may travel over a chain wheel as if it were made of one piece that is not divided.

The described chain lock is suitable mainly for devices controlled by hand, where no high circumferential speeds are required, such as flame cutting machines for tubes, milling machines for tubes and the like.

I claim:

1. A roller chain lock comprising in combination first and second jaws, a pivot rotatably connecting said first and second jaws to each other, a pin connecting the first jaw to one end link of the chain, said first jaw having a cylindrical recess at a distance from said pin equal to the pitch of the chain links a sleeve of another chain link being adapted to fit into said recess, a cylindrical surface on the first jaw disposed eccentrically with respect to the axis of said recess of the first sleeve, a second sleeve on the chain link adjacent said other chain link being adapted to slide along said eccentric surface to tighten the first sleeve against the cylindrical recess in the first jaw, and means for applying said second jaw against said second sleeve to hold the latter in position on said cylindrical surface.

2. A roller chain lock comprising in combination first and second jaws, a pivot rotatably connecting said first and second jaws to each other, a pin connecting the first jaw to one end link of the chain, said first jaw having a cylindrical recess therein at a distance equal to the pitch of the chain links from said pin and adapted to receive a sleeve of another chain link, a cylindrical surface on the first jaw eccentrically with respect to the axis of said recess and in sliding engagement with a second chain link adjacent said other chain link to tighten the first sleeve against the cylindrical recess in the first jaw, a nose on the second jaw for securing the second sleeve in position against said cylindrical surface, and means for exerting pressure on the nose to lock the second sleeve in said position.

3. A roller chain lock as claimed in claim 2, wherein said means for exerting pressure on the nose of the second jaw includes a screw extending through said second jaw and supported against the first jaw.

References Cited in the file of this patent

UNITED STATES PATENTS

| | | |
|---|---|---|
| 767,095 | Zepp | Aug. 9, 1904 |
| 1,086,725 | O'Neil | Feb. 10, 1914 |